W. C. MARGEDANT.
BAND SAWING-MACHINE.

No. 170,577. Patented Nov. 30, 1875.

W. C. MARGEDANT.
BAND SAWING-MACHINE.

No. 170,577. Patented Nov. 30, 1875.

4 Sheets—Sheet 2.

Witnesses:
Inventor
Wm. C. Margedant
By
Attorneys.

4 Sheets—Sheet 3.
W. C. MARGEDANT.
BAND SAWING-MACHINE.
No. 170,577. Patented Nov. 30, 1875.
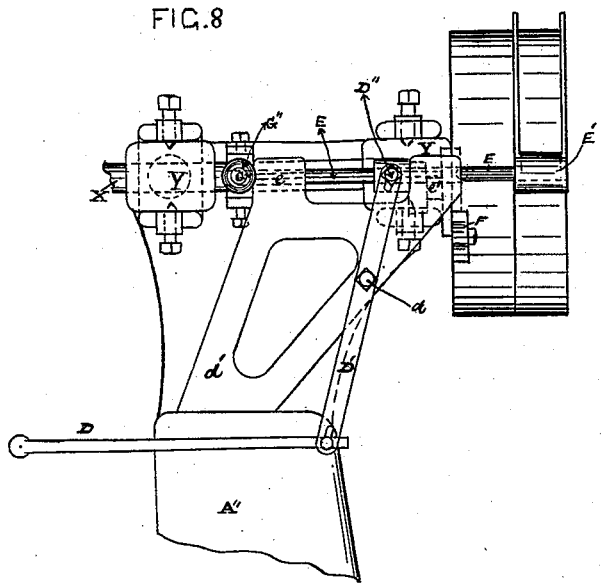
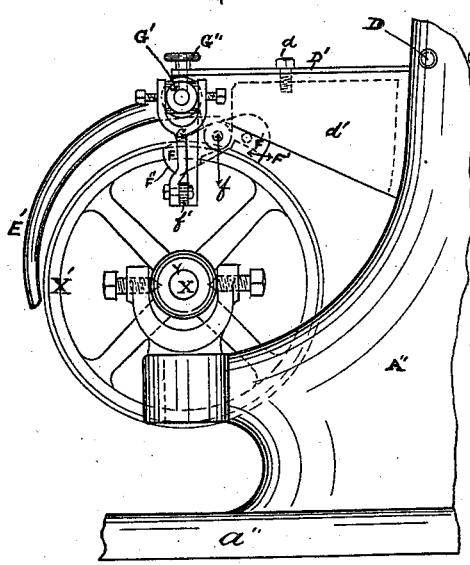
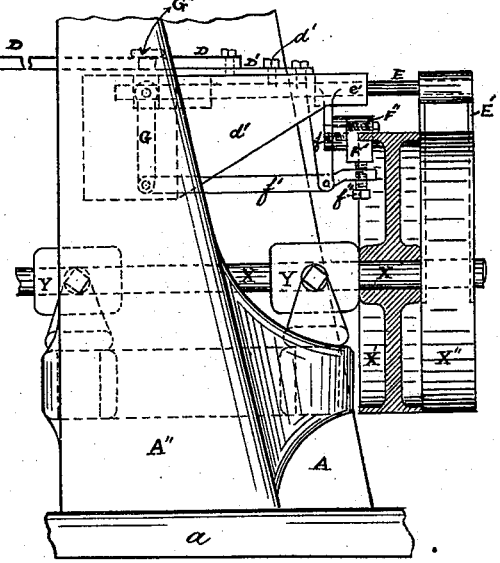
Witnesses:
Inventor:
Wm. C. Margedant
By _____
Attorneys.

4 Sheets—Sheet 4.

W. C. MARGEDANT.
BAND SAWING-MACHINE.

No. 170,577. Patented Nov. 30, 1875.

Witnesses:
Colon C Kemon
Chas. A. Pettit

Inventor
Wm. C. Margedant
By
Attorneys.

UNITED STATES PATENT OFFICE.

WILLIAM C. MARGEDANT, OF HAMILTON, OHIO, ASSIGNOR TO BENTEL, MARGEDANT & CO., OF SAME PLACE.

IMPROVEMENT IN BAND SAWING-MACHINES.

Specification forming part of Letters Patent No. 170,577, dated November 30, 1875; application filed November 16, 1875.

*To all whom it may concern:*

Be it known that I, WILLIAM C. MARGEDANT, of Hamilton, in the county of Butler and State of Ohio, have invented a new and useful Improvement in Band Sawing-Machines; and I do hereby declare that the following is a full, clear, and exact description of the same, reference being had to the accompanying drawings forming part of this specification.

The nature and objects of this invention consist, first, in a novel arrangement of the idler or band-saw wheel, to prevent the irregular strain and buckling of the saw-blade, the overrunning of the idler band-saw wheel, and the produced friction thereof with the saw-blade, which causes the crystallization and early breaking of the same; to equalize the speed of the band-saw wheels at the starting, operating, and stopping of the motion of the saw; to prevent the tearing and wearing of the leather or rubber covering of the idler-wheel; to prevent any undue strain, buckling, or straining of the saw-blade which might be caused by the heating of the journals or bearings of the idler saw-wheel, to effect which results the said wheel is constructed with a loose or sliding face, periphery, or rim. Second, in the arrangement of an adjustable and quickly-acting clutch-brake, which does not affect and destroy the horizontal position of the driving-shaft and band-saw wheel, and which can be used in combination with the driving-belt shifter, or as a belt-shifter only, at the will of the operator. Third, in the arrangement of the combined lateral and back thrust saw-guides, supporting the saw-blade in close proximity to the material by rolling and changing saw-blade guides. Fourth, in the arrangement to adjust the idler band-saw wheel to a relative position with the driving band-saw wheel, to keep the blade running at a required place on the periphery of the wheels.

Figure 1:
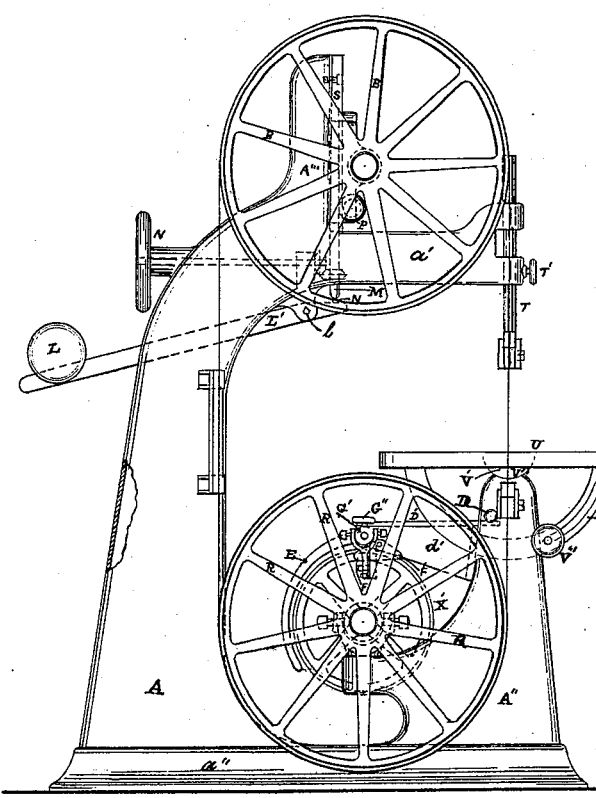
Figure 2:
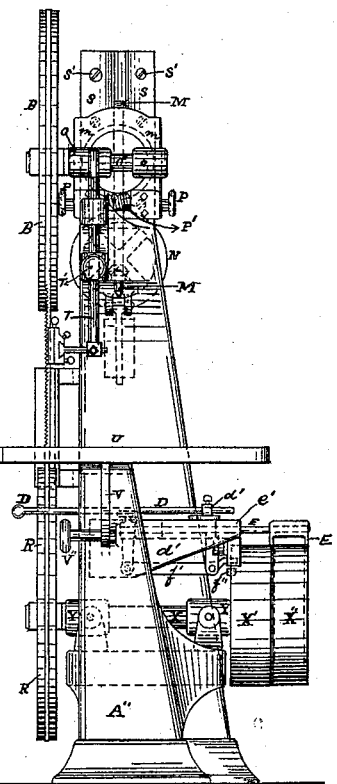
Figure 3:
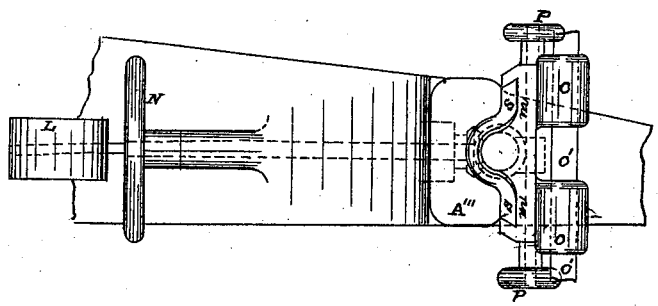
Figure 4:
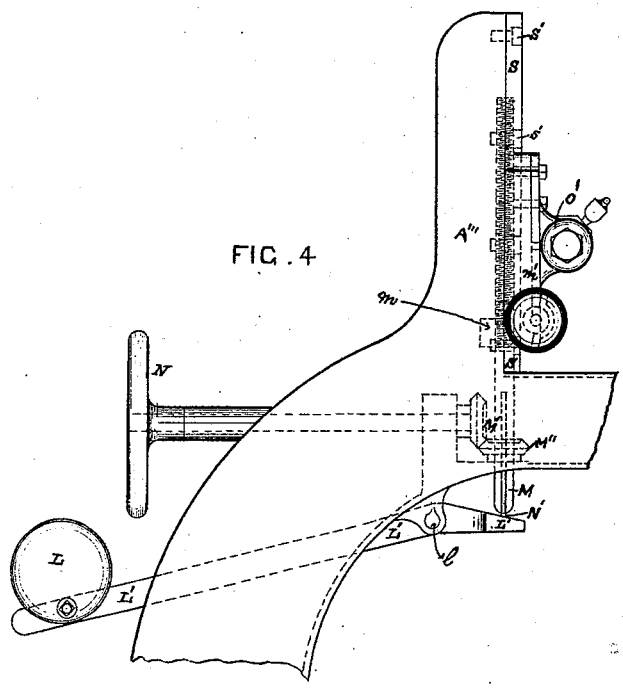
Figure 5:
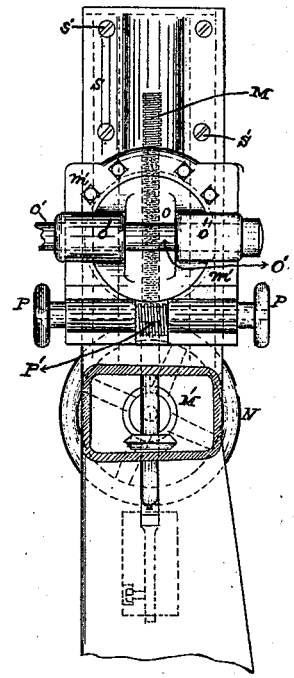
Figure 13:
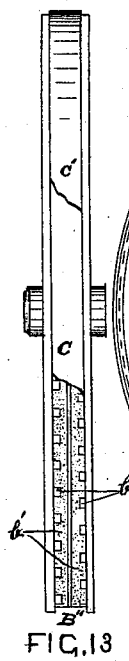
Figure 12:
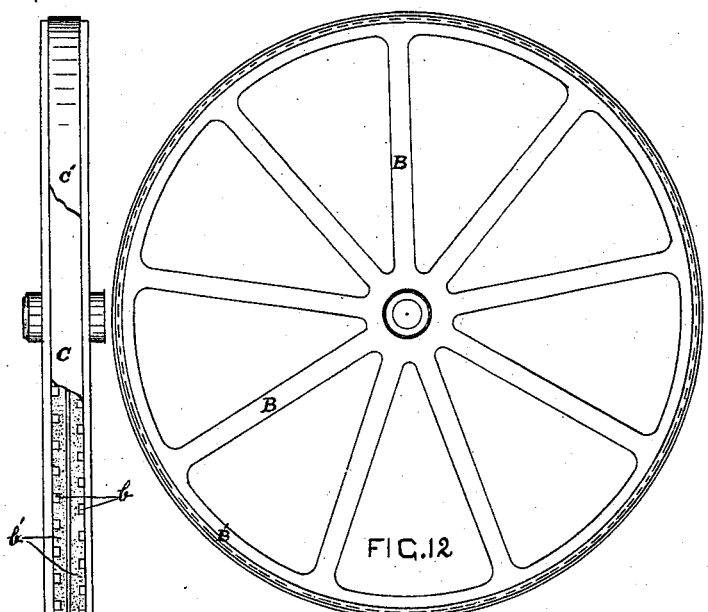
Figure 14:
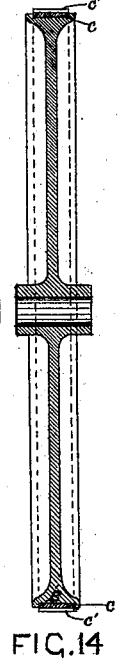
Figure 10:
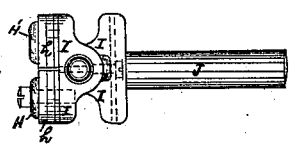
Figure 9:
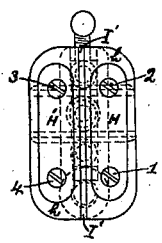

Figure 1 is a side elevation of a band sawing-machine embodying the improvements; Fig. 2, a front elevation of the same. Figs. 3, 4, 5, 6, 7, and 8 are enlarged sectional side, front, and top elevations of the same, showing the improvements on a larger scale. Fig. 9 is a front elevation of the saw-guide; Fig. 10, a top view, and Fig. 11 a sectional view, of the same through the line I I'. Fig. 12 is a front elevation of the idler-wheel, showing on its periphery the projection of the leather covering, and in dotted lines the loose sliding rim; Fig. 13, a side elevation of the same, with partly broken-off leather covering and sliding rim, showing the sliding way in the wheel. Fig. 14 is a sectional view of the same. Figs. 15, 16, 17, and 18 are partly front elevations and sectional views of modifications of my improved wheel.

Of the various tools used for cutting wood the saw is, perhaps, the most valuable, and among them the band-saw is acknowledged to be best adapted for different work. Although the band-saw has been introduced more than sixty years ago in almost the same form, and provided with nearly the same commodities as now used, nevertheless some obstructive mechanical disadvantage has prevented the general use of the same. The breaking of the saw-blades and the difficulty of joining them have been the main obstacles. It is true, the manufacturers of steel have given us a better article of steel, and the saw-makers have succeeded in manufacturing saw-blade ribbons which are far superior to those heretofore used. Improvements in joining the saw-blades have also been made, and now it is a very simple operation; but, with the exception of having blades of better quality of steel, very little has been done to prevent and remedy the first cause of the breakage of the delicate saw-blades.

In examining the working of the band-saw we find that the driven tight and loose pulley connected with the lower band-wheel runs, say, from three hundred and fifty to four hundred and fifty revolutions per minute. When the operator shifts the driving-belt from the loose to the tight pulley, it sets the lower band-wheel at once in motion at the same speed, provided a slipping of the driving-belt does not take place.

If the lower band-wheel is made of suitable material, and well constructed, it withstands the sudden jar from rest, or its inertia, to a velocity of four hundred revolutions; but the upper band-wheel has to be brought at once to the same number of revolutions, or the communicating medium between the upper and lower band-wheel—the light and delicate steel ribbon, the band-saw—will have to slip. This is the case: it slips, and is destructive to the saw-blade, as it creates heat and crystallizes the steel. The strain on the blade is also at that moment very much increased, which favors the breaking of the same. Furthermore, if slipping of the blade takes place, the covering of the wheels is damaged, and in the course of time torn off. Suppose, now, both wheels in equal and proper motion; the operator is ready to feed the material toward the saw-blade, and as soon as the saw enters the material (which it will have to do many times in ten hours of work) a change, perhaps a slight one, in the speed takes place. The upper band-wheel, no matter how light or heavy it has been made, has acquired a certain amount of momentum, which will cause it to overrun the lower wheel, again creating friction, and consequently heat, developing crystallization of the saw-blade. That part of the saw-blade which passes upward is more strained when the idler-wheel overruns the driving band-wheel; then the friction of the blade against the faster-running wheel takes place, while that part of the blade passing downward has a reduced tension, making it liable to buckle at the point of entering the material.

It is well known that by stopping the motion of the band-saw, especially when effective brakes are employed for that purpose, the lower wheel, as the deliverer of the motion, stops first, while the momentum acquired by the upper band-wheel causes it to overrun the lower band-wheel. To remedy this mechanical obstruction and disadvantage, the makers of band-saw machines have aimed to make the idler band-wheel as light as it could possibly be made, often disregarding the laws and established formulas of strength; the rims of wheels being made of pasteboard, wood, cork, and other light and elastic material, while others make the idler-wheel of thin plate-steel, supported by cored arms. Brakes have also been attached, which engage the driver and the idler-wheel at once; but, as the mechanism of such device is itself changeable, it is evident that no better result is obtained. There is no doubt that in making the upper or idler wheel lighter than the driving-wheel, the momentum of the overrunning of the idler-wheel, as well as the power required to bring it from its inertia to a required velocity, is much reduced, and that the destructive results of slipping, heating, buckling, and crystallization and breakage of the blade are diminished, but the cause of it is not removed. No matter how light and delicate the upper or idler wheel is made, it certainly acquires a momentum equal to the weight and motion.

My improvements embodied in the band-saw or idler wheel, as illustrated in the accompanying drawing from Figs. 12 to 18, will remove all this mechanical obstruction, and reduce the breakage of saw-blades resulting therefrom. I shall now explain the construction, referring to the accompanying drawings.

Fig. 12 is a cast-iron band or idler wheel. It consists of the usual center hub, spokes or arms, and rim, the latter being covered with leather or india-rubber. In the arrangement of the rim the improvements are embraced.

B' is the rim of the wheel, constructed with a recess, B'', of the proper depth. On the inner recess periphery of the wheel a number of projections, b, are formed, which are accurately turned and ground to a true circle, corresponding exactly to the center of the hub. The space b' between the projections is filled with plumbago, or other suitable lubricating material, to the height of the projections. C is a band of steel, iron, or other serviceable material, rolled and turned true on the inside and outside, and also edgewise, to the diameter and width of the projection b in the recess of the rim of the band-wheel or idler-wheel. The band C is open, and after it has been placed in the recess of the rim B' it is so closed that it can be enlarged or reduced in diameter. The band C is then covered with leather C' or other material, and ground to a true circle.

The above are elements of the improvements on the idler band-wheel. They can be changed in construction and design, as partly indicated in Figs. 15, 16, 17, and 18, which I will explain after I describe the operation and result of the improvement.

The band-wheels are placed on their proper place. The saw-blade is attached to the wheels, and then receives the proper strain. The operator shifts the belt from the loose pulley to the tight pulley. The lower wheel is at once set into the motion of the tight pulley, the saw-blade communicating this motion to the upper wheel. The latter, being at rest, does not and cannot follow at once with the speed acquired by the lower wheel. Now, the band C C' slides in the recess of the rim, producing friction on the projections, and sets the upper band-wheel gradually in the same number of revolutions as the lower band-wheel, while the saw-blade has at once acquired the speed of the driving band-wheel. It is not required that in starting the saw the sliding rim C C' should slide several times around the idler-wheel before it sets the idler-wheel by the produced pressure and friction of the sliding band into the same speed as the driving band-wheel. A movement of a few inches is sufficient to break the force of the sudden strain, and to avoid any friction of the saw-blade on the periphery of the idler-wheel. After the idler-wheel has acquired the speed of the driving-wheel it is kept in the same by the pressure of the sliding band C C', because it requires more power to slide the sliding band C C' in the recess of the idler-wheel when running in the same direction than to turn the idler-wheel on its journals.

If the speed of the driving band-wheel should be abruptly reduced, as the case is sometimes in wood-cutting shops when starting heavy planers, the momentum of the idler-wheel will cause it to slide forward in the sliding band C C' until the speed or momentum of both band-wheels is equalized.

A fact lamented by most of our mechanical authorities is, that as soon as the material is brought in contact with the running saw-blade a reduction in speed of the driving band-wheel takes place, which transfers from there to the first motive power, and that the idler-wheel with the acquired momentum overruns the driving-wheel whenever a reduction of the speed takes place from any cause. My practical demonstration establishes the truth of the calculation that whenever the speed is abruptly reduced by the above cause or in stopping, the sliding rim C C' with the saw-blade revolves with the speed of the driving band-wheel, and the idler band-wheel is brought forward by the force of its momentum, creating a noiseless and harmless friction inside the sliding rim C C', but not on the saw-blade, as is the case with other band-saws.

I will now explain the action of the sliding rim when the belt is shifted from the driving-pulley to the loose pulley, and the motion of the saw stopped. The driving band-wheel, which carries on its shaft the tight and loose pulley, stops first. If at the moment of the shifting the saw-blade would be run off it would be found that the idler band-wheel keeps on revolving for a considerable time, while the lower wheel would be at rest. It is the momentum acquired by the upper wheel, which is equal to its diameter, weight, and speed. That this produces an undue strain on the part of the saw-blade passing upward, an overrunning of the idler-wheel, and a consequent friction on the saw-blade, and a dangerous looseness on the part of saw-blade passing downward, will be readily seen. If direct-acting brakes for stopping the motion are used the overrunning will be more marked. With my improved wheel the motion of the saw-blade can at once be arrested, which is of importance when the blade should stick, (as it is technically called.) The idler-wheel will simply revolve inside the band C' until the momentum is arrested by the friction of the band C against the projection b in the recess B''.

Another advantage is gained by the use of my improved idler-wheel. Manufacturers of band-saws have aimed to provide the wheels and arrange the saw-frame so that the delicate saw-blade would have an elastic bed, which would yield to the unevenness and irregularity of the motion to some extent. Springs, weights, &c., attached to the upper slide and journal-boxes are not sensitive enough, because they act through the medium of levers. Heavy coverings for the idler-wheel, formed of india-rubber, cork, and other material, may, perhaps, form a soft, elastic bed; but as the thickness of the material is seldom minutely uniform, even after it is ground on its outside to a true circle, and its resistance and elasticity are not alike and all the same at the whole periphery of the wheel, it favors a rough motion rather than arresting the same. The sliding band C C', turned true on the inside and outside, and then covered with leather rolled to a uniform thickness to form a bed for the teeth of saw-blades when set, (as it is called,) forms a true elastic bed for the variation of motion. It is well known that a ring or a balanced band set into a fast-revolving motion enlarges by the action of the centrifugal force. All particles of the band are equally driven by this force from the center of the motion. Although this increase of the diameter of the sliding band on the idler-wheel is very little, perhaps not measurable, it amounts to something, which, with the little looseness of the band itself, acts against the tension of the saw-blade produced by the weight or springs; and as the centrifugal force lifts or loosens the sliding ring to some extent from its bed in the wheel, keeping it slightly in a state of equilibrium, it forms thereby a yielding bed for the saw-blade.

It sometimes happens in the general run of shops that, on account of neglect or bad lubrication, the journals heat, and that then the idler band-wheel is brought to a stop. I have frequently stopped my improved band-wheel by means of blocks thrown between the arms, and running the driving-wheel and sliding band alone; the saw-blade was not affected by the stopping or dragging of the idler band-wheel.

I shall now describe the second part of my improvement in band-saws, consisting of an adjustable clutching double brake, which is detachable from the belt-shifter. A rod, D, with suitable handle, (located close to the operator,) passes through the stand A'', and engages on the other side of the stand a lever, D', which has its fulcrum of movement with the bolt d fastened in the bracket d'. The other end of the lever D' is provided with a slot, in which the stop-nut D'' engages with a projecting pin. The stop-nut D'' is fastened to a horizontal shifting-bar, B, which rests in bearings e e' of the bracket d'. The shifting-bar E has on the end which is nearest to the driving-pulley x' and loose pulley x'' a circular bent fork, E', held to the bar E by means of a set-screw. The belt-fork E' can be fastened to the shifting-bar E in such a manner that the fork will inclose a belt passing from either side of the pulley. On the end of the bracket toward the driving and loose pulley a projection is formed, which is close to the upper part of the driving-pulley. It serves there as a nut and rest for the fulcrum-bolt f. The brake-plate E, carrying the swiveling brake-jaws F' F'', of which F'' rests on the inside, and F' on the outside, of the rim of the driving-pulley, is held at the bracket $d'$ by the fulcrum-bolt $f$, on which it swivels. It will be understood by this that, whenever the brake-jaw F'' presses on the inside of the rim of the driving-pulley, the brake-jaw F' presses with the same force on the outside of the rim of the driving-pulley. The projection of the bracket $d'$ serves also as the fulcrum of the forcing-lever $f'$, which has the end toward the pulley provided with a set-screw, $f''$, pressing against the brake-plate F. As the fulcrum of the forcing-lever $f'$ is very close to that end of the lever provided with the set-screw $f''$, it will be obvious that only a small amount of force is required on the opposite part of the lever to produce a strong clutching pressure on the rim of the driving-pulley. G is a link, fastened to the long end of the forcing-lever $f'$. The other end of the link ends in a fork, which embraces the sliding nut G', provided with a hole, through which the shifting-bar E passes.

A thumb set-screw, G'', on the sliding nut G', permits the sliding nut to be fastened to the shifting-bar E. Whenever it is desired to shift the driving-belt from the tight to the loose pulley without breaking the momentum of the wheels and driving-shaft at once, the thumb-screw G'' can be loosened, which will permit the shifting-bar to slide through the sliding nut G'; in short, the brake can be at any time disengaged from the shifting apparatus or connected therewith.

It is claimed by manufacturers and users of the band-saws that the brake on band-saw machines is a nuisance. It is so with the band-saw machines provided with the old idler band-wheels, and the sudden forced stoppage of the lower wheel, the overrunning of the idler-wheel, and the produced friction endanger the saw-blades. This is the reason, perhaps, that most of the band-saws are not provided with these very useful time-saving implements, and that whenever found with saws, they are generally so arranged as not to be effective.

Band-saws with my improved idler band-wheel counteract the bad effect of a quick-acting brake, and it is therefore that I arrange the brake in such a manner that it performs quickly and directly, and that it may be re-adjusted whenever worn to its former activity, which is easily accomplished by adjusting the set-screw $f''$ until the leather covering of the brake-jaws is worn off, to be replaced by a new covering.

By using two brake-jaws, one of which engages on the outside of the pulley, and the other on the inside of the same with equal force, not only more friction is produced, but more and a sudden force can be employed, because the pressure of one brake-jaw is counterbalanced by that of the other, so that the pulley cannot gradually move away from the brake in proportion to the force applied, as is the case with other brakes. But not only the driving-pulley is raised from its bed and forced against the caps of the journal-boxes by the use of single-acting brakes; the horizontal position of the driving-shaft and the vertical adjustment and relation of the driving band-wheel to the idler-wheel are destroyed. I arrange the link G in such a manner that whenever the brake is applied to the full pressure, and the belt has been shifted to the idler-pulley, the lever has passed the dead-point, and is held in this position by the bearing of the shifter-rod. Thus arranged, it will keep the belt always on the loose pulley, and the brake-jaws engaged on the rim of the same, so that the brakes are not liable to become accidentally disengaged and start the saw while the operator may be handling the same. The striking of moving belt against the belt-fork E', and the constant jar and vibration of the same, cannot disengage either the brake or shifter, as it is common with brakes and shifters forced by wedges, keyways, or inclines. As it is often necessary to revolve the band-wheel by hand, especially when saw-blades are changed and adjusted, it is of importance to disengage the brake, so that the band-wheels can be revolved while the belt is on the loose pulley. By loosening simply the thumb-screw G'', and shoving the lever back, the brake is disengaged, and will keep so until the thumb-screw is fastened again, all of which may be done while the saw is running.

Figure 11:
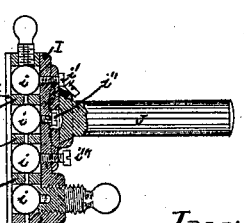

I will now describe the construction and the working of the saw-guide, as shown in Figs. 9, 10, and 11. The office of the guide is to support the saw-blade on the sides and back. It therefore consists of lateral and back thrust guides or supporters. The lateral guides are formed of flat pieces of wood, which are arranged on each side of the saw, so that they can be closed up to the saw-blade and adjusted to compensate for the wear. The back-thrust guide consists of a series of finely-turned and hardened cast or chilled iron balls, and steel washers of the same diameter as the balls, having a hole drilled through the center, the balls and washers lying on each other alternately in a cylindrical inclosure drilled into the cast-iron which forms the support for the lateral and back thrust guides. A groove of the proper width is cut lengthwise through the cylinder, so that the back of the saw comes in contact with the balls, and as the balls rest only on the edge of the small holes drilled through the supporting-washers, and the balls can all be brought forward and adjusted to a perpendicular line established by the back of the saw-blade, the saw-blade, when passing downward, will cause the steel balls to revolve sufficiently to prevent the cutting of the saw-blade into the balls. The adjusting-screws back of the balls, which support and hold the balls against the pressure of the blade, have the points coming in contact with the balls arranged a very little eccentric, which will cause the balls to revolve irregularly, presenting gradually the whole surface of the ball to the support of the blade.

Special arrangement for the adjustment of the lower ball, which has to withstand the most pressure, is given with a firmer support and an independent adjustment of the steel washers and of the other balls. The whole arrangement of the guide is laterally and horizontally adjustable. H H' are oblong metallic washers, which are held down by the screws 1, 2, 3, and 4. h h' are layers of wood, provided with slots, through which the screws 1 2 3 4 pass into the iron support I. The latter consists of two wings, supporting the lateral wooden guides, and of a cylindrical opening passing at right angles through the center of the support I. I' are the longitudinal slots cut through the front of the support I. $i'\ i''\ i'''$ are screws to support and regulate the position of the balls $i\ i\ i\ i$.

The intermediate washers K K K have holes drilled through the center for the passage of a lubricator and for a rest of the balls. J is a round pin, which slides in the support T, and with which the guide may be adjusted. The pin J is held by the guide-bar T above the table. (Shown on the drawing.) The other guide is fastened below the table, in close proximity to the top of the table, so that the blade is received and guided by a ball as soon as it leaves the material.

The advantage of the guide constructed as above described over those which are now in use will be understood at once by those familiar with the use of band-saws. The problem, as far as it has developed itself in practice, is to resist the back thrust of the saw-blade, in such a manner that not only a true and effective guide is obtained, which keeps the saw-blade under various conditions and applications in a perpendicular line, but the friction of the fast-passing blade should be reduced to the smallest minimum, while abrasion of the blade and guide and the heating should be avoided. It is also of importance to have the back guide, as well as the lateral guides, close to the material to be operated upon. The lateral guides, as now used, consisting of adjustable pieces of wood, seem to answer admirably for the purpose. I therefore have adopted them on my improved guide.

The back-thrust guides, as generally used, may be classified in three classes: such which revolve by the friction of the blade; such which are revolved by independent mechanism; and those which are immovable to the passage of the saw, but which can be so adjusted that they present other parts not affected by the abrasion of the saw to the support of the blade.

My new arrangement of back-thrust guides comprises, in a novel form, two of the above classes. I use no revolving wheels which turn on their centers, because they support the blade only at one small point, and not closer to the material to be sawed than the radius of the wheel forming the support, which is often more than two inches. They also have the disadvantage that whenever the saw-blade forms an abrasion it is formed in a line over the whole periphery of the wheel, which makes it unfit for use at that place and a certain distance from it. A series of hardened balls give a longer support to the back of the saw-blade; and they support the blade very close to the material operated upon, and, on account of their rolling, resist the abrasion of the passing saw-blade more effectually. Further, a cutting over the whole surface of the ball in one line cannot take place, as it revolves irregularly, in consequence of the eccentrically-bearing back screw. If a wheel is employed as a back-thrust guide it must always be so adjusted that it revolves in a true perpendicular line with the blade; otherwise a slipping at the point of contact takes place, which must result, first, in marking, followed by cutting, of the rim. It does not matter whether balls are accurately adjusted to the line of the saw, as they roll in any position. Steel bars or plates used for support of the back thrust of saws are soon worn and cut, and have to be removed. The saw-blade, in making the abrasion on these stationary guides, very soon roughens on the back, and the friction of the particles favors a change in the flexure of the same, which will soon crystallize the blade.

I will now specify the device for making the adjustment for straining the saw-blade more sensitive to the varying length of the saw-blade.

L is a weight of proper dimension, which can be adjusted on the lever L'. The short part of the lever, on the other side of the fulcrum $l$, presses against the regulating-screw M, which passes through the horizontal miter-gear M'', engaging therewith by means of a slot and feather to the nut $m$. The nut $m$ forms a part of the sliding idler-wheel carriage $m'$. The hand-wheel N is connected, by the medium of a shaft, with the vertical miter-gear M'.

It will be seen that by turning the hand-wheel N in one or the other direction the regulating-screw will be turned in the nut $m$, which will cause the idler-carriage to raise or to lower on the guide-slides S. This arrangement permits the idler band-wheel to be regulated for long or short band-saw blades; but as they will change in length by the change of condition, especially on account of friction and developed heat, and the strain given to the saw-blade should be uniform, it is necessary to regulate the same automatically.

The construction or device to regulate the plane of rotation of the idler band-wheel, in conformity with the line of the rotation of the driving band-wheel, I will now explain. The sliding carriage $m'$ carries the housing $o$ for the brass journal-boxes supporting the mandrel $o'$ of the idler band-wheel B. The journal-boxes $o''\ o'''$ are connected by a circular-shaped flange cast thereon, which is on its periphery turned in a V shape. A part of the V-shaped edge of the flange is cut with a screw or worm thread.

In the sliding carriage a circular recess is formed, corresponding in diameter and depth to the flange O, connecting the journal-boxes $o''$ $o'''$. The edge or border of this recess is cut in a V shape, so that it will fit close around the flange O, only permitting the turning of the same. P P are hand-wheels, which are fastened to a screw or worm, P', resting in the bearings $o''$ $o'''$. If the hand-wheels are turned the connecting screw or worm P' engages in the thread cut in the flange, causing the same to turn in the recess of the sliding carriage $m'$.

As the journals are cast with the flange, and the boxes are the support of the idler-wheel mandrel, it follows that a change in the horizontal position of the mandrel will cause a change in the plane of rotation of the idler band-wheel, which is often required in practice.

The advantages embodied in this arrangement over those now generally used are, easy and correct adjustment, facilities for adjustment of the idler band-wheel while it is running or at rest, and on either side of the machine, arresting vibrating motion, as the worm holds the flange against upward or downward motion.

It now remains for me to describe those parts of the band-saw machine which have not been mentioned above.

R is the lower wheel as usually found with band-saws. It is fastened to the shaft X, which carries also the driving-pulley X' and loose pulley X''. The shaft rests in the swiveling journal-boxes Y Y. T is the adjustable guide-bar, which slides in the support, forming part of the frame, and is held by the hand-wheel and screw T'. The swiveling table U for the support of the material to be sawed is heavy-ribbed. It rests in the circular cup U'', with a projection of the same circle V'. The arc V has a slot, through which the hand-screw V''' passes, and by loosening the same the table can be set at a different angle, and by fastening the hand-screw the table will be kept in the given position.

Figure 16:
Figures 15, 17:
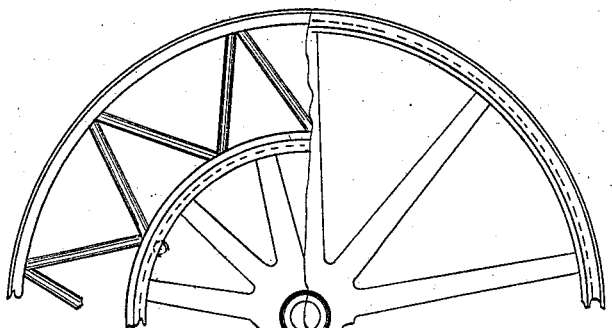
Figure 18:
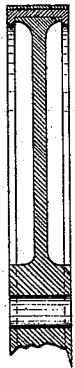

Fig. 15 is another form of an idler band-wheel. The rim is arranged for sliding in nearly the same manner as that which I now use. The support of the sliding band, braced by arms, arranged in zigzag form, has an independent rotation on the wheel proper. Small rollers inserted in the rim, as shown, would reduce the friction produced by the rotation of double sliding rim. Fig. 16 is a sectional view of the same.

Fig. 17 shows another mode of arranging the sliding rim. It consists of a band with cramped edges, so that it overlaps the wheel proper, and is supported thereby.

Many other modifications of the form of the different improvements could be made.

I am aware of the fact that it is not new to employ, in connection with a band-saw, a brake operating upon one side of the wheel or pulley, and I therefore confine my invention, with respect to this feature, to a double-acting brake operating upon both sides of the periphery of the wheel, for the purpose hereinbefore described.

Having thus described my invention, what I claim as new, and desire to secure by Letters Patent, is—

1. A band-saw wheel having a loosely-revolving face, periphery, or rim, as and for the purpose described.

2. The combination, with the driving-pulley and actuating mechanism of a band-saw, of the double-acting brake F, arranged to clamp the wheel upon opposite sides of its periphery to avoid straining the shaft, substantially as described.

3. The combination, with the brake F and the lever $f'$, of the link G, band-shifter E', and rod E, as and for the purpose described.

4. The combination, with the band-saw blade, of one or more spherical back-thrust guides, for the purpose described.

5. The combination, with spherical back-thrust guides $i$, of the eccentrically-located back screws, as and for the purpose described.

6. The combination, with the spherical guides $i$ and the eccentrically-located back screws, of perforated intermediate washers K, as and for the purpose described.

7. The combination of the idler band-saw wheel-shaft with the sliding carriage $m'$, the toothed plate O, and the worm or screw P, as and for the purpose described.

WILLIAM C. MARGEDANT.

Witnesses:
SOLON C. KEMON,
CHAS. A. PETTIT.